(12) United States Patent
Bailey et al.

(10) Patent No.: US 10,471,945 B2
(45) Date of Patent: Nov. 12, 2019

(54) BRAKE-BY-WIRE SYSTEM WITH PISTON PRY-BACK PREVENTION

(71) Applicant: GM Global Technology Operations LLC, Detroit, MI (US)

(72) Inventors: Shaun M. Bailey, Royal Oak, MI (US); Anthony J. Rifici, West Bloomfield, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 15/813,591

(22) Filed: Nov. 15, 2017

(65) Prior Publication Data

US 2019/0143950 A1    May 16, 2019

(51) Int. Cl.
| | |
|---|---|
| *B60T 8/00* | (2006.01) |
| *B60T 8/50* | (2006.01) |
| *B60T 13/74* | (2006.01) |
| *B60T 8/24* | (2006.01) |
| *B60T 13/66* | (2006.01) |

(52) U.S. Cl.
CPC ............... *B60T 8/50* (2013.01); *B60T 8/246* (2013.01); *B60T 13/662* (2013.01); *B60T 13/745* (2013.01); *B60T 2270/82* (2013.01)

(58) Field of Classification Search
CPC .... F16D 65/567; F16D 65/18; F16D 2123/00; F16D 2121/24; F16D 2121/02; B60T 8/5006; B60T 8/50; B60T 8/447; B60T 8/00; B60T 7/22; B60T 7/122; B60T 2270/82; B60T 2201/06; B60T 17/221;
(Continued)

(56) References Cited

U.S. PATENT DOCUMENTS

| 6,247,560 B1* | 6/2001 | Bunker ................... B60T 1/065 188/18 A |
| 2007/0205659 A1* | 9/2007 | Hatano ..................... B60T 8/00 303/113.4 |

(Continued)

FOREIGN PATENT DOCUMENTS

| JP | 06329015 A | * 11/1994 |
| JP | 2010095023 A | * 4/2010 |

(Continued)

*Primary Examiner* — Bradley T King
*Assistant Examiner* — Stephen M Bowes
(74) *Attorney, Agent, or Firm* — Cantor Colburn LLP

(57) ABSTRACT

A Brake-By-Wire (BBW) system for a vehicle includes a brake rotor, a caliper, a master cylinder, and a controller. The caliper is adapted to exert a hydraulic force upon the brake rotor during a braking action. The master cylinder includes a housing, a piston, an actuator, and a hydraulic fluid reservoir. The housing defines a piston cavity. The actuator is adapted to controllably move the piston within the piston cavity. A compensation opening is defined by the housing, and is in fluid communication between the reservoir and the piston cavity. A fluid opening is defined by the housing, and is in fluid communication between the caliper and the piston cavity. The controller is configured to receive a vehicle condition signal and send a command signal to the actuator that effects closure of the compensation opening based on the vehicle condition signal to prevent hydraulic fluid flowback to the hydraulic fluid reservoir.

6 Claims, 3 Drawing Sheets

(58) Field of Classification Search
CPC ...... B60T 17/22; B60T 13/745; B60T 13/686; B60T 13/662
See application file for complete search history.

(56) References Cited

U.S. PATENT DOCUMENTS

2009/0183958 A1* 7/2009 Sano ................... B60T 8/00
                                                    188/204 R
2009/0184573 A1* 7/2009 Nakajima ............ B60T 8/00
                                                    303/155
2009/0326776 A1* 12/2009 Tomlinson .......... B60T 13/662
                                                    701/72

FOREIGN PATENT DOCUMENTS

JP       2012245975 A * 12/2012
KR     20090109292 A * 10/2009

* cited by examiner

BRAKE-BY-WIRE SYSTEM WITH PISTON PRY-BACK PREVENTION

INTRODUCTION

The subject disclosure relates to a vehicle brake-by-wire (BBW) system, and more particularly, to a piston pry-back prevention system of the BBW system.

Traditional service braking systems of a vehicle are typically hydraulic fluid based systems actuated by an operator depressing a brake pedal that generally actuates a master cylinder. In-turn, the master cylinder pressurizes hydraulic fluid in a series of hydraulic fluid lines routed to respective calipers, or brake assemblies, located adjacent to each wheel of the vehicle. Such hydraulic braking may be supplemented by a hydraulic modulator assembly that facilitates anti-lock braking, traction control, and vehicle stability augmentation features. The wheel brakes may be primarily operated by the manually-actuated master cylinder with supplemental actuation pressure gradients supplied by the hydraulic modulator assembly during anti-lock, traction control, and stability enhancement modes of operation.

Brake responsiveness is impacted by the clearance between the rotor of the brake assembly and the brake pads of the adjacent caliper. During ideal driving conditions, existing hydraulic systems can maintain this clearance at a minimum. Unfortunately, during certain road conditions and/or vehicle maneuvers, the rotor may deflect with respect to the caliper. In some applications, this deflection may be influenced by axle bearings and other vehicle structures, vehicle lateral acceleration, vehicle maneuvers with a turning radius, rough road conditions, and a host of other contributing factors. The rotor deflection causes the brake pad(s) to recede into the caliper housing and hydraulic fluid to flowback toward the master cylinder. This causes an excessive clearance between the brake pad and the rotor when the rotor is no longer deflected.

Advancements in braking systems, and specifically the BBW systems generally detach the brake pedal from the master cylinder. That is, the brake pedal is no longer mechanically, or hydraulically linked, to the master cylinder. Improvements in braking responsiveness as it relates to rotor deflection utilizing attributes of more current BBW systems is desirable.

SUMMARY

A Brake-By-Wire (BBW) system for a vehicle according to one, non-limiting, embodiment of the present disclosure includes a brake rotor, a caliper, a master cylinder, and a controller. The caliper is adapted to exert a hydraulic force upon the brake rotor during a braking action. The master cylinder includes a housing defining a piston cavity, a piston, an actuator adapted to controllably move the piston within the piston cavity, and a hydraulic fluid reservoir. A compensation opening is defined by the housing and is in fluid communication between the reservoir and the piston cavity. A fluid opening is defined by the housing and is in fluid communication between the caliper and the piston cavity. The controller is configured to receive a vehicle condition signal and send a command signal to the actuator that effects closure of the compensation opening based on the vehicle condition signal to prevent hydraulic fluid flow-back to the hydraulic fluid reservoir.

Additionally to the foregoing embodiment, the BBW system includes a pry-back prevention module stored in a storage medium of the controller and executed by a processor of the controller, wherein the pry-back prevention module is configured to process the vehicle condition signal and generate the command signal.

In the alternative or additionally thereto, in the foregoing embodiment, the vehicle condition signal is a vehicle maneuver signal indicative of a vehicle maneuver.

In the alternative or additionally thereto, in the foregoing embodiment, the rotor is constructed and arranged to rotate with a vehicle wheel about a rotational axis and the caliper is fixed to a vehicle structure and positioned with respect to a structure centerline, and wherein the rotational axis co-extends with the centerline during a normal vehicle operation mode and is misaligned to the centerline during a vehicle rotor deflected mode associated with the vehicle condition signal.

In the alternative or additionally thereto, in the foregoing embodiment, the vehicle condition signal is indicative of the rotor being deflected.

In the alternative or additionally thereto, in the foregoing embodiment, the rotor is in contact with the caliper when deflected.

In the alternative or additionally thereto, in the foregoing embodiment, the BBW system includes a brake pedal electrically connected to the Electronic Control Unit (ECU), and wherein the brake pedal is not depressed when the rotor is in contact with the caliper when deflected.

In the alternative or additionally thereto, in the foregoing embodiment, the ECU is configured to send a terminate command to the actuator upon completion of a vehicle maneuver associated with the vehicle condition signal.

A vehicle BBW system according to another, non-limiting, embodiment includes a brake rotor, a caliper, a master cylinder, a controller, and a pry-back prevention module. The caliper is adapted to exert a hydraulic force upon the brake rotor during a braking action. The master cylinder includes a housing defining a piston cavity, a piston, and an actuator adapted to controllably move the piston within the piston cavity. A compensation opening is defined by the housing and is in fluid communication with the piston cavity. A fluid opening is defined by the housing and is in fluid communication between the caliper and the piston cavity. The piston is adapted to close the compensation opening preventing hydraulic fluid flowback, and open the compensation opening to relieve fluid pressure. The pry-back prevention module is stored and executed by the controller, and is configured to receive a vehicle condition signal indicative of a deflected rotor condition and output a command signal to the actuator causing the piston to close-off the compensation opening to prevent flowback of hydraulic fluid from the caliper and to the master cylinder.

Additionally to the foregoing embodiment, the vehicle BBW system includes a pressure sensor constructed and arranged to measure hydraulic fluid pressure, and configured to send a hydraulic fluid pressure signal to the pry-back prevention module, wherein the pry-back prevention module is configured to determine if the hydraulic fluid pressure exceeds a preprogrammed threshold pressure during the deflected rotor condition, and upon exceeding the preprogrammed threshold pressure, output a second command signal to the actuator causing the piston to open the compensation opening.

In the alternative or additionally thereto, in the foregoing embodiment, the master cylinder includes a hydraulic fluid reservoir at about atmospheric pressure, and the compensation opening is in fluid communication between the cavity and the hydraulic fluid reservoir.

In the alternative or additionally thereto, in the foregoing embodiment, the vehicle condition signal is a vehicle maneuver signal indicative of a vehicle maneuver.

In the alternative or additionally thereto, in the foregoing embodiment, the rotor is constructed and arranged to rotate with a vehicle wheel about a rotational axis and the caliper is fixed to a vehicle structure and positioned with respect to a structure centerline, and wherein the rotational axis co-extends with the centerline during a normal vehicle operation mode and is misaligned to the centerline during a vehicle rotor deflected mode associated with the vehicle condition signal.

In the alternative or additionally thereto, in the foregoing embodiment, the rotor is in contact with the caliper when in the deflected rotor condition.

In the alternative or additionally thereto, in the foregoing embodiment, the BBW system includes a brake pedal electrically connected to the controller, and wherein the brake pedal is not depressed when the rotor is in contact with the caliper when deflected.

The above features and advantages and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description of embodiments, the detailed description referring to the drawings in which.

DETAILED DESCRIPTION

Figure 1:
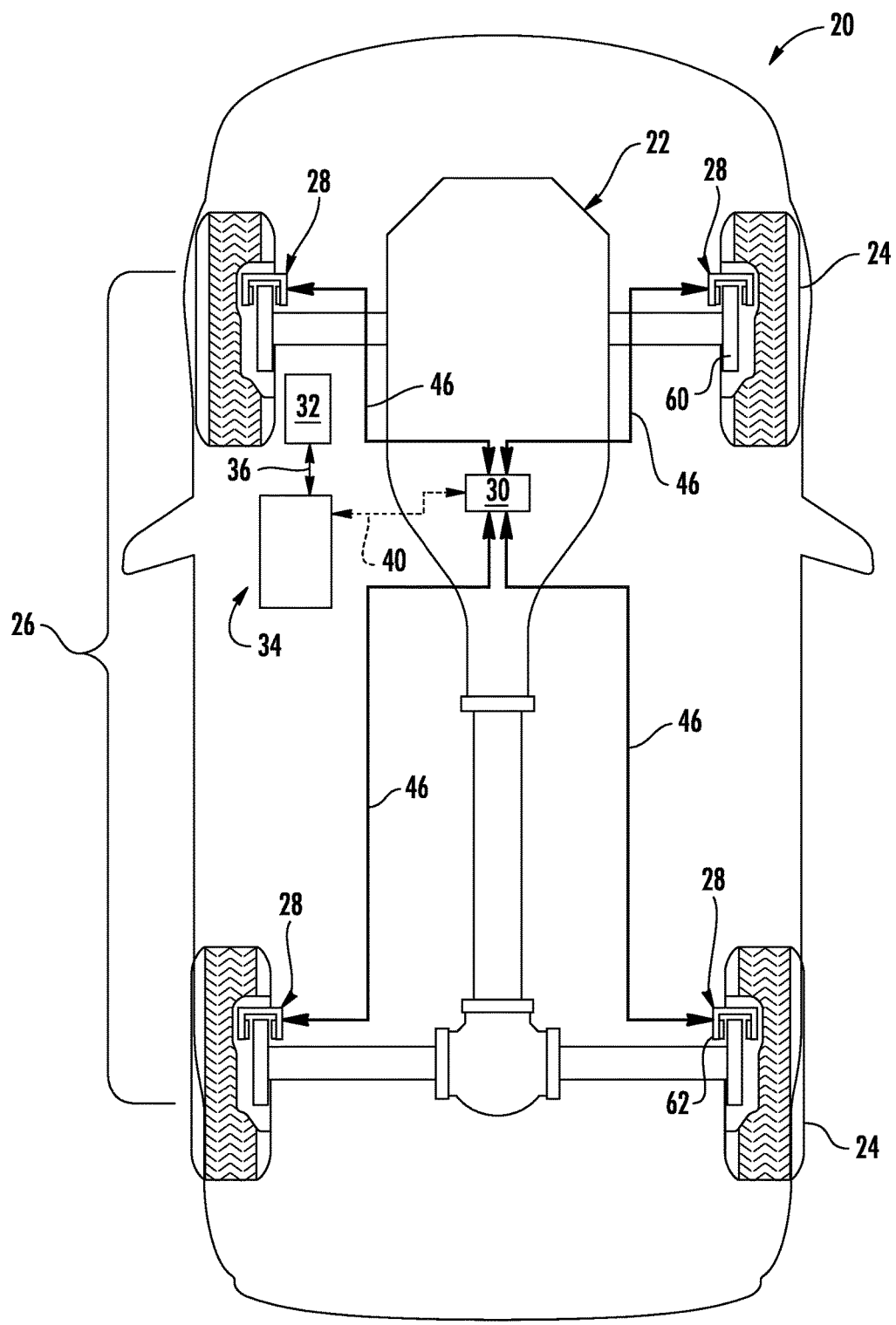
FIG. 1 is a schematic of a vehicle utilizing a BBW system with a piston pry-back prevention feature as one non-limiting example in accordance with the present disclosure.

The following description is merely exemplary in nature and is not intended to limit the present disclosure, its application or uses. It should be understood that throughout the drawings, corresponding reference numerals indicate like or corresponding parts and features. As used herein, the terms module and controller refer to processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality.

Referring to FIG. 1, a non-limiting, exemplary, embodiment of a vehicle 20 is illustrated. The vehicle 20 may include a powertrain 22 (i.e., an engine, transmission and differential), a plurality of rotating wheels 24 (i.e., four illustrated), and a BBW system 26. The powertrain 22 is adapted to drive at least one of the wheels 24 thereby propelling the vehicle 20 upon a surface (e.g., road). The BBW system 26 is configured to generally slow the speed and/or stop motion of the vehicle 20, and may include a hydraulic brake assembly 28 for each respective wheel 24, a master cylinder 30, a brake pedal 32, and a controller 34 (e.g., Electronic Control Unit (ECU)). The vehicle 20 may be a racing vehicle, and/or may be an automobile, truck, van, sport utility vehicle, or any other self-propelled or towed conveyance suitable for transporting a burden.

Figure 2:
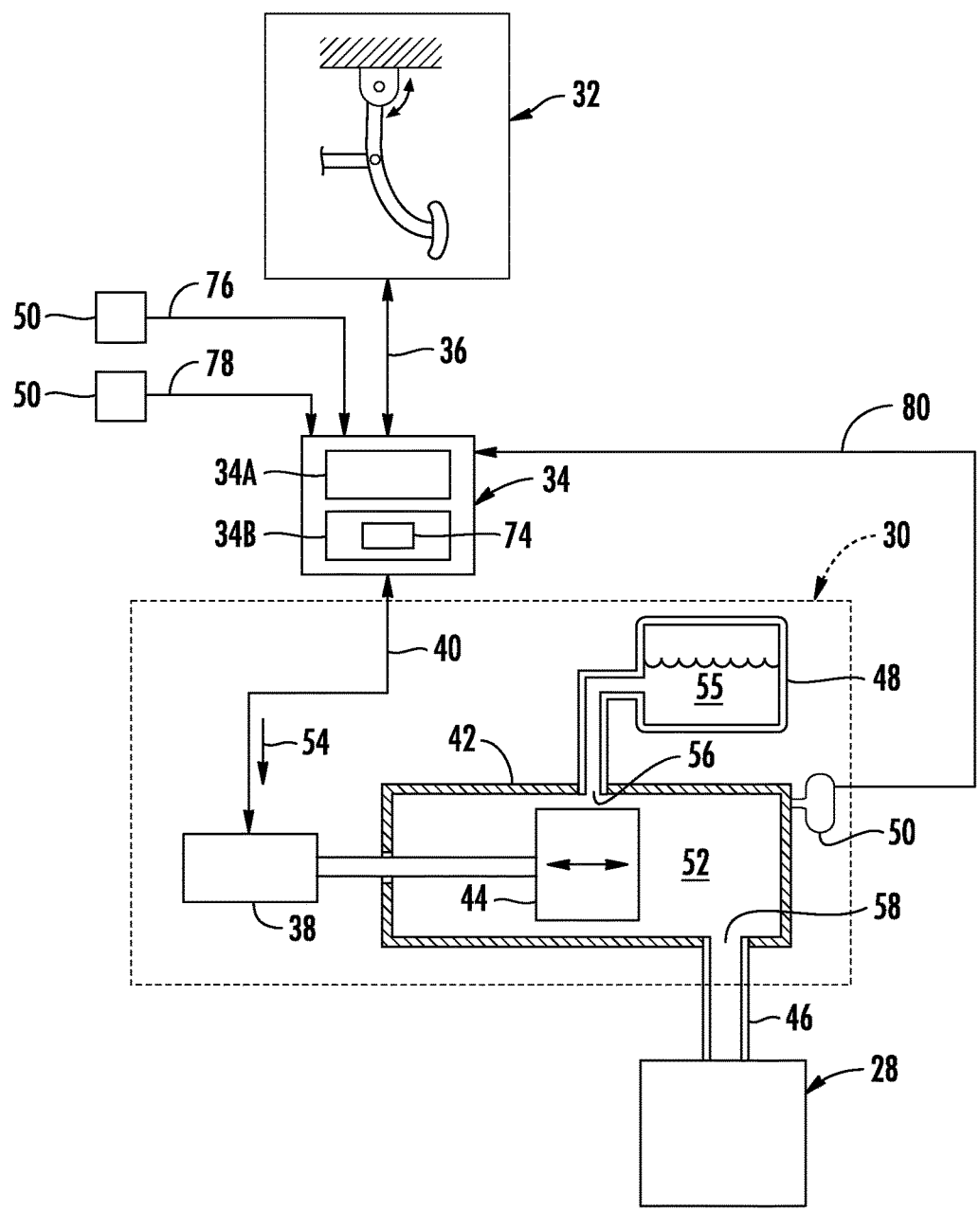
FIG. 2 is a schematic of the BBW system.

Referring to FIGS. 1 and 2, the brake pedal 32 may be electrically connected to the controller 34 via electrical pathway 36, and the controller 34 may be electrically connected to an electric actuator 38 of the master cylinder 30 (e.g., motor) via electrical pathway 40, as is generally known in the art of BBW systems. The master cylinder 30 may further include a housing 42, a piston 44, a plurality of conduits, or hydraulic lines, 46 (i.e. four illustrated in FIG. 1), a hydraulic fluid reservoir 48, and at least one parameter sensor 50 (e.g., pressure sensor). The housing 42 includes boundaries that define a cavity 52. The electric actuator 38 is constructed and arranged to receive command signals (see arrow 54) over pathway 40, and when commanded, to move the piston 44 within the cavity 52. As the piston 44 moves, a portion of the cavity 52 containing hydraulic fluid 55 varies in volume. The pathways 36, 40 may be wired or wireless pathways.

The housing 42 of the master cylinder 30 may further include boundaries that define a compensation opening 56 (e.g., port) and at least one fluid opening 58 (e.g., port). The compensation opening 56 provides fluid communication, which may be direct, between the cavity 52 and the hydraulic fluid reservoir 48. The fluid opening 58 provides fluid communication between the cavity 52 and the hydraulic lines 46 for flow of the hydraulic fluid 55 between the master cylinder 30 and the brake assemblies 28 in response to actuation of the piston 44. In operation, the fluid opening 58 is in continuous communication between the cavity 52 and the hydraulic lines 46 regardless of the positioning of the piston 44. In contrast, the compensation opening 56 may at times be blocked by the piston 44, thereby isolating the hydraulic fluid reservoir 48 from the cavity 52. The hydraulic fluid reservoir 48 may be at about atmospheric pressure, and the cavity 52 may be constructed and arranged to function above atmospheric pressure when the brake assemblies 28 are actuated.

Figure 3:
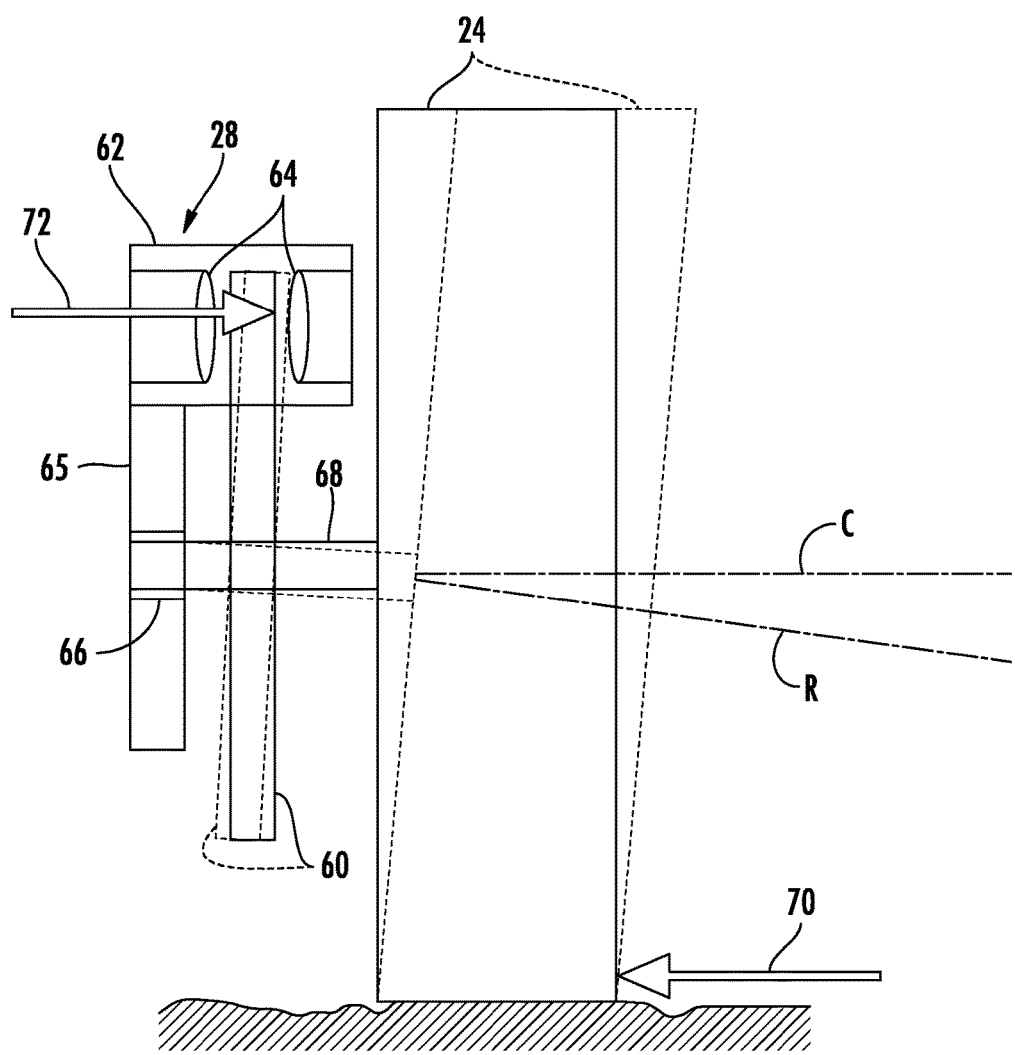
FIG. 3 is a schematic of a brake assembly of the BBW system and a vehicle wheel illustrated in a normal vehicle operating mode and a vehicle rotor deflected mode.

Referring to FIGS. 2 and 3, with continuing reference to FIG. 1, each brake assembly 28 may include a rotor 60 and a caliper 62. The caliper 62 may include opposing brake pads 64 with a portion of the rotor 60 disposed therebetween. Each hydraulic line 46 is connected to a respective caliper 62 of the brake assemblies 28 for actuation of the brake pads 64 against the rotor 60 during a braking scenario. The caliper 62 may be rigidly connected to a vehicle structure 65 that may, for example, include a bearing 66 concentrically disposed to a vehicle centerline C, and for substantially frictionless rotation of a wheel axle 68 about a rotational axis R. The wheel axle 68 may be rigidly connected to the rotor 60 and the vehicle wheel 24.

During a normal vehicle operation mode, the rotational axis R may co-extend with the centerline C, and the rotor 60 is generally centered between the brake pads 64 of the caliper 62 (see FIG. 3). During a vehicle rotor deflected mode (see ghost depiction in FIG. 3), the centerline C and the rotational axis R may be misaligned (i.e., transverse or tilted) causing the rotor 60 to contact and drag upon one of the brake pads 64. The vehicle rotor deflected mode may be caused by various vehicle conditions. Examples of such conditions may be a dynamic vehicle maneuver, rough road conditions causing excessive vehicle vibration, and others.

In one example, the vehicle maneuver may be a vehicle turn scenario at a specified turn radius and speed. Such a turning maneuver will initiate a cornering force (see arrow 70 in FIG. 3), and a resultant force (see arrow 72) exerted by the deflected rotor 60 upon the brake pad 64 of the caliper 62. In more conventional BBW systems, the resultant force 72 may cause the brake pad to displace and move away from the rotor.

The ECU 34 may include at least one processor 34A (e.g., microprocessor) and an electronic storage medium 34B that may be computer readable and writeable. Non-limiting examples of the controller 34 may include an arithmetic logic unit that performs arithmetic and logical operations; an electronic control unit that extracts, decodes, and executes instructions from a memory; and, an array unit that utilizes multiple parallel computing elements. Other examples of the controller 34 may include an engine control module, and an application specific integrated circuit. It is further contemplated and understood that the controller 34 may include redundant controllers, and/or the system may include other redundancies, to improve reliability of the BBW system 26.

The BBW system 26 may further include a piston pry-back prevention module, or routine, 74 that may be, at least in-part, software based, stored in the storage medium 34B, and executed by the processor 34A (see FIG. 2). In operation, the piston pry-back prevention module 74 causes the piston 44 of the master cylinder 30 to close-off, thereby preventing the pushback of the hydraulic fluid 55 out of the caliper 62 and into the reservoir 48 when the rotor 60 is deflected (i.e., during a vehicle rotor tilt condition).

In one embodiment, and during operation, the ECU 34 may be configured to receive a vehicle condition signal indicative of a vehicle maneuver and or road condition(s) that may cause excessive road wheel vibration. In the example of such a vehicle maneuver, the vehicle condition signal may be a vehicle maneuver signal outputted by one or more of the sensors 50. The vehicle maneuver signal may include steering and lateral acceleration signals, 76, 78 (see FIG. 2) indicative of producing the corner force 70 of sufficient magnitude to cause deflection of the rotor 60. In this way, the pry-back prevention module 74 may determine an imminent rotor tilt condition, and/or an existing rotor deflected condition. In another embodiment, the vehicle 20 may be an autonomous vehicle. As an autonomous vehicle, the vehicle maneuver signal 76, 78 may be generated by the ECU 34 (i.e., generally independent of any sensors), or other controller, once the ECU determines that it shall direct the vehicle to make the associated maneuver.

Upon such a rotor deflected determination, the pry-back prevention module 74 may generate, and the ECU 34 may output, a command signal 54 to the actuator 38 that causes the piston 44 of the master cylinder 30 to close-off the compensation opening 56. This prevents hydraulic fluid pushback into the reservoir 48, thus preventing pry-back of the brake pad 64. Because the brake pad 64 is generally hydraulically constrained, some drag may be created between the deflected rotor 60 and the brake pad 64. This drag, however, is minimal. When the vehicle 20 returns to a normal operating mode (e.g., driving straight), any excessive clearance between the brake pad 64 and the now, un-deflected, rotor 60 is eliminated, or minimized, and brake responsiveness is maintained.

In one embodiment, and when the vehicle 20 generally returns to the normal operating mode, the ECU 34 may be configured to send another command signal 54 (i.e. a terminate command signal) to the actuator 38 upon completion of the vehicle maneuver associated with the vehicle maneuver signal.

The parameter sensors 50 may also include a hydraulic fluid pressure sensor orientated to measure fluid pressure in the cavity 52 of the master cylinder 30. Alternatively, the pressure sensor may be mounted in one or more hydraulic fluid lines 46 or calipers 62. The pressure sensor 50 may be configured to send a fluid pressure signal 80 to the ECU 34 for processing by the pry-back prevention module 74. If the fluid pressure in, for example, the hydraulic cylinder cavity 52 exceeds a preprogrammed pressure threshold, the pry-back prevention module 74 may generate a command signal 54 that, at least briefly, effectuates exposure of the compensation opening 56 to "burp" or relieve the braking system of fluid pressure. The pressure threshold may be established to prevent excessive drag between the deflected rotor 60 and the brake pad 64 during the vehicle rotor deflected mode, and when the brake pedal 32 is not depressed.

Because the ECU 34 knows the fluid pressure in the BBW system 26, the ECU may know when the compensation opening 56 is closed by the piston 44 because fluid pressure will begin to build. While the compensation opening 56 is open, or exposed, the opening will allow the hydraulic fluid 55 to flow out and not build pressure. If the master cylinder pressure is rising, but the master cylinder piston 44 is not moving (i.e., the actuator 38 is not trying to create fluid pressure), then the ECU 34 may determine that the increasing pressure is due to pry-back, knock-back, or heat growth. The logic in the pry-back prevention module 74 may then be to keep pressure below the allowed threshold pressure, and the piston 44 would relieve pressure by backing off, and exposing the compensation opening 56.

In another embodiment, the compensation opening 56 may be normally closed. That is, the piston 44 may close-off the compensation opening 56 during normal vehicle operation and even when the rotor 60 is not deflected. In this embodiment, the pry-back prevention module 74 may be programmed to occasionally burp the BBW system 26 to keep hydraulic pressure below a preprogrammed upper threshold.

The pry-back prevention module 74 may be part of a control module and/or may be, or may be part of, one or more Application Specific Integrated Circuit(s) (ASIC), electronic circuit(s), central processing unit(s) (e.g., microprocessor and associated memory and storage) executing one or more software or firmware programs and routines, combinational logic circuit(s), input/output circuit(s) and devices, appropriate signal conditioning and buffer circuitry, and other components to provide the described functionality. Software, firmware, programs, instructions, routines, code, algorithms and similar terms mean any controller executable instruction sets including calibrations and look-up tables. The control module has a set of control routines executed to provide the desired functions. Routines are executed, such as by a central processing unit, and are operable to monitor inputs from sensing devices and other networked control modules, and execute control and diagnostic routines to control operation of actuators and other devices.

Advantages and benefits of the present disclosure include a more responsive BBW system 26, because excessive clearance between the rotor 60 and the brake pad 64 due to rotor deflection is minimized, or prevented. Other advantages include a system with this responsiveness feature that does not require additional hardware to achieve and may be implemented via software (i.e., the pry-back prevention module 74).

The present disclosure may be a system, a method, and/or a computer program product. The computer program product may include a computer readable storage medium (or media) having computer readable program instructions thereon for causing a processor to carry out aspects of the present invention.

The computer readable storage medium 34B may be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the ECU 34, partly on ECU, as a stand-alone software package, partly on the ECU and partly on a remote computer or entirely on the remote computer or server. In the latter scenario, the remote computer may be connected to the ECU through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

While the disclosure is described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but that the invention will include all embodiments falling within the scope thereof.

What is claimed is:

1. A vehicle Brake-By-Wire (BBW) system comprising:
    a brake rotor;
    a caliper adapted to exert a hydraulic force upon the brake rotor during a braking action;
    a master cylinder including a housing defining a piston cavity, a piston, an actuator adapted to controllably move the piston within the piston cavity, a compensation opening defined by the housing and in fluid communication with the piston cavity, and a fluid opening defined by the housing and in fluid communication between the caliper and the piston cavity, wherein the piston is constructed and arranged to close the compensation opening to prevent hydraulic fluid flowback and open the compensation opening to relieve fluid pressure;
    a controller;
    a pry-back prevention module stored and executed by the controller, the pry-back prevention module is configured to receive a vehicle condition signal indicative of a deflected rotor condition and output a command signal to the actuator causing the piston to close-off the compensation opening to prevent flowback of hydraulic fluid from the caliper and to the master cylinder; and
    a pressure sensor constructed and arranged to measure hydraulic fluid pressure, and configured to send a hydraulic fluid pressure signal to the pry-back prevention module, wherein the pry-back prevention module is configured to determine if the hydraulic fluid pressure exceeds a preprogrammed threshold pressure during the deflected rotor condition, and upon exceeding the preprogrammed threshold pressure, output a second command signal to the actuator causing the piston to open the compensation opening.

2. The vehicle BBW system set forth in claim 1, wherein the master cylinder includes a hydraulic fluid reservoir at about atmospheric pressure, and the compensation opening is in fluid communication between the cavity and the hydraulic fluid reservoir.

3. The vehicle BBW system set forth in claim 1, wherein the vehicle condition signal is a vehicle maneuver signal indicative of a vehicle maneuver.

4. The vehicle BBW system set forth in claim 3, wherein the rotor is constructed and arranged to rotate with a vehicle wheel about a rotational axis and the caliper is fixed to a vehicle structure and positioned with respect to a structure centerline, and wherein the rotational axis co-extends with the centerline during a normal vehicle operation mode and is misaligned to the centerline during a vehicle rotor deflected mode associated with the vehicle condition signal.

5. The vehicle BBW system set forth in claim 1, wherein the rotor is in contact with the caliper when in the deflected rotor condition.

6. The vehicle BBW system set forth in claim 5, further comprising:
    a brake pedal electrically connected to the controller.

* * * * *